US008720956B2

(12) United States Patent
Murray

(10) Patent No.: US 8,720,956 B2
(45) Date of Patent: May 13, 2014

(54) MECHANICAL TAILGATE LOCKING SYSTEM

(75) Inventor: Sean Murray, Galena, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1004 days.

(21) Appl. No.: 12/638,079

(22) Filed: Dec. 15, 2009

(65) Prior Publication Data

US 2011/0140461 A1 Jun. 16, 2011

(51) Int. Cl.
E05C 9/16 (2006.01)
B62D 33/00 (2006.01)

(52) U.S. Cl.
USPC ..... 292/48; 292/216; 292/336.3; 292/DIG. 3; 292/DIG. 23; 292/DIG. 29; 292/DIG. 43; 296/51; 49/192

(58) Field of Classification Search
USPC ........... 292/44–48, 216, DIG. 25, DIG. 29, 3, 292/11, 24–26, 30, 53, DIG. 17, DIG. 23, 292/DIG. 43, DIG. 65, 4–8, 29, 31, 52, 54, 292/194, 213, 214, 217, 336.3, DIG. 30, 292/DIG. 42, DIG. 3; 296/50, 51, 57.1, 296/146.8, 146.11, 146.12; 49/192; 16/366–371, 229, 230, 231
See application file for complete search history.

(56) References Cited

U.S. PATENT DOCUMENTS

| 2,782,062 | A | * | 2/1957 | Smith | 292/216 |
|---|---|---|---|---|---|
| 2,827,321 | A | * | 3/1958 | Leslie et al. | 292/5 |
| 2,911,247 | A | * | 11/1959 | Corbin | 292/48 |
| 2,955,865 | A | * | 10/1960 | Leslie et al. | 292/280 |
| 3,454,299 | A | * | 7/1969 | Hewitt et al. | 296/50 |
| 3,563,589 | A | * | 2/1971 | Kwasiborski, Jr. | 292/216 |
| 3,567,274 | A | * | 3/1971 | Kaptur, Jr. et al. | 296/50 |
| 3,592,504 | A | * | 7/1971 | Sandor | 296/70 |
| 4,076,301 | A | | 2/1978 | Gergoe | |
| 4,157,844 | A | * | 6/1979 | Sarosy et al. | 292/48 |
| 4,505,500 | A | * | 3/1985 | Utsumi et al. | 292/48 |
| 4,896,906 | A | * | 1/1990 | Weinerman et al. | 292/48 |
| 4,951,486 | A | * | 8/1990 | Braun et al. | 70/208 |
| 5,069,491 | A | * | 12/1991 | Weinerman et al. | 292/48 |
| 5,117,665 | A | * | 6/1992 | Swan et al. | 70/264 |
| 5,295,374 | A | | 3/1994 | Bender et al. | |
| 5,718,465 | A | * | 2/1998 | Dowling et al. | 292/216 |
| 5,896,767 | A | * | 4/1999 | Gomi | 70/237 |
| 5,947,536 | A | | 9/1999 | Mizuki et al. | |
| 6,017,067 | A | | 1/2000 | Yoneyama et al. | |
| 6,135,513 | A | * | 10/2000 | Hamada et al. | 292/201 |
| 6,427,500 | B1 | * | 8/2002 | Weinerman et al. | 70/135 |
| 6,467,320 | B1 | | 10/2002 | Choo | |
| 6,629,711 | B1 | * | 10/2003 | Gleason et al. | 292/216 |
| 6,701,671 | B1 | * | 3/2004 | Fukumoto et al. | 49/280 |
| 7,093,876 | B2 | * | 8/2006 | Romig et al. | 296/50 |

(Continued)

Primary Examiner — Carlos Lugo
Assistant Examiner — Alyson M Merlino
(74) Attorney, Agent, or Firm — Rankin, Hill & Clark LLP

(57) ABSTRACT

A tailgate synchronizer for coordinating mechanical communications between handles and locking assemblies in a vehicle V closure includes a synchronizer locking device moveable to a locked state for preventing the handles from unlatching the locking assemblies. The synchronizer further includes a pair of handle levers corresponding to the handles and a pair of actuator levers corresponding to the locking assemblies. Movement of the handles is selectively translated into unlatching of the lock assemblies based on a state of the locking assemblies. Movement of the handles is prevented from translating into unlatching of the lock assemblies when the synchronizer locking device is in the locked state.

17 Claims, 11 Drawing Sheets

(56) References Cited

U.S. PATENT DOCUMENTS

| | | | |
|---|---|---|---|
| 7,150,486 B2 * | 12/2006 | Ichinose | 296/51 |
| 7,165,800 B2 * | 1/2007 | Thiele et al. | 296/50 |
| 7,201,422 B2 | 4/2007 | Plett et al. | |
| 7,243,973 B2 * | 7/2007 | Plett et al. | 296/57.1 |
| 7,258,373 B2 * | 8/2007 | Plett et al. | 292/210 |
| 7,441,816 B2 * | 10/2008 | Watanabe et al. | 292/216 |

* cited by examiner

MECHANICAL TAILGATE LOCKING SYSTEM

BACKGROUND

Exemplary embodiments herein broadly related to tailgates, and more particularly relate to a tailgate synchronizer for coordinating mechanical communications between handles and locking assemblies in a tailgate.

One known tailgate synchronizer coordinates mechanical communications between first and second handles mounted to a tailgate and first and second lock assemblies that selectively lock the tailgate to a vehicle body. This known tailgate synchronizer includes a first lock assembly actuator lever rotatably mounted to the tailgate and a second lock assembly actuator lever rotatably mounted to the tailgate. The first lock assembly actuator lever is selectively moveable by the first handle and the second lock assembly actuator lever is selectively moveable by the second handle.

The first lock assembly actuator lever is connected to the first lock assembly so that the first lock assembly actuator lever unlocks the first lock assembly when sufficiently moved by the first handle. The second lock assembly actuator lever is connected to the second lock assembly so that the second lock assembly actuator lever unlocks the second lock assembly when sufficiently moved by the second handle. Advantageously, the first handle is always fully moveable but only selectively able to sufficiently move the first lock assembly actuator lever. Likewise, the second handle is always fully moveable but only selectively able to sufficiently move the second lock assembly actuator lever. An example of such a known tailgate synchronizer is disclosed in U.S. Pat. No. 7,201,422, expressly incorporated herein by reference.

SUMMARY

In accordance with one aspect, a tailgate synchronizer is provided for coordinating mechanical communications in a tailgate from a first handle for unlocking a first lock assembly of the tailgate and from a second handle for unlocking a second lock assembly of the tailgate. More particularly, in accordance with this aspect, the tailgate synchronizer includes a first lock assembly actuator lever and a second lock assembly actuator lever. The first lock assembly actuator lever is connected to an associated first lock assembly to unlock the associated first lock assembly when rotated. The second lock assembly actuator lever is connected to an associated second lock assembly to unlock the associated second lock assembly when rotated. Movement of the first handle is selectively translated into rotation of the first lock assembly actuator lever based on a state of the second lock assembly actuator lever and a state of a synchronizer locking device. Movement of the second handle is selectively translated into rotation of the second lock assembly actuator lever based on a state of the first lock assembly actuator lever and the state of the synchronizer locking device.

In accordance with another aspect, the tailgate synchronizer includes a first lock assembly actuator lever that unlocks an associated first lock assembly when rotated and a second lock assembly actuator lever that unlocks an associated second lock assembly when rotated. A first handle lever is rotated by actuation of an associated first handle. Rotation of the first handle is selectively imparted to the first lock assembly actuator lever to mechanically connect actuation of the associated first handle to unlocking of the associated first lock assembly. A second handle lever is rotated by actuation of an associated second handle. Rotation of the second handle lever is selectively imparted to the second lock assembly actuator lever to mechanically connect actuation of the associated second handle to unlocking of the associated second lock assembly. The tailgate synchronizer further includes a synchronizer locking device for preventing imparting of rotation of the first handle lever to the first lock assembly actuator lever and imparting of rotation of the second handle lever to the second lock assembly actuator lever.

In accordance with still another aspect, a synchronizer is provided for coordinating mechanical communications between handles and locking assemblies in a vehicle closure. More particularly, in accordance with this aspect, the synchronizer includes a synchronizer locking device moveable to a locked state for preventing the handles from unlatching the locking assemblies. The synchronizer further includes a pair of handle levers corresponding to the handles and a pair of actuation levers corresponding to the locking assemblies. Movement of the handles is selectively translated into unlatching of the lock assemblies based on a state of the locking assemblies. Movement of the handles is prevented from translating into unlatching of the lock assemblies when the synchronizer locking device is in the locked state.

In accordance with a further aspect, a slider mechanism for a tailgate synchronizer includes a pin lever having one end rotatably secured to a sensor lever. The pin is moved by the sensor lever between a first position when the sensor lever indicates that an associated locking assembly is locked and a second position when the sensor lever indicates that the associated locking assembly is unlocked. A pin is slidably disposed along a longitudinal length of the pin lever. The pin is slidably movable between a first position wherein the pin is aligned with a handle lever for translating movement of the handle lever to a lock assembly actuator lever when the pin lever is in the first position and a second non-actuating position wherein the pin is offset from the handle lever and thereby does not translate movement of the handle lever to the lock assembly actuator lever.

DETAILED DESCRIPTION

Figure 1:
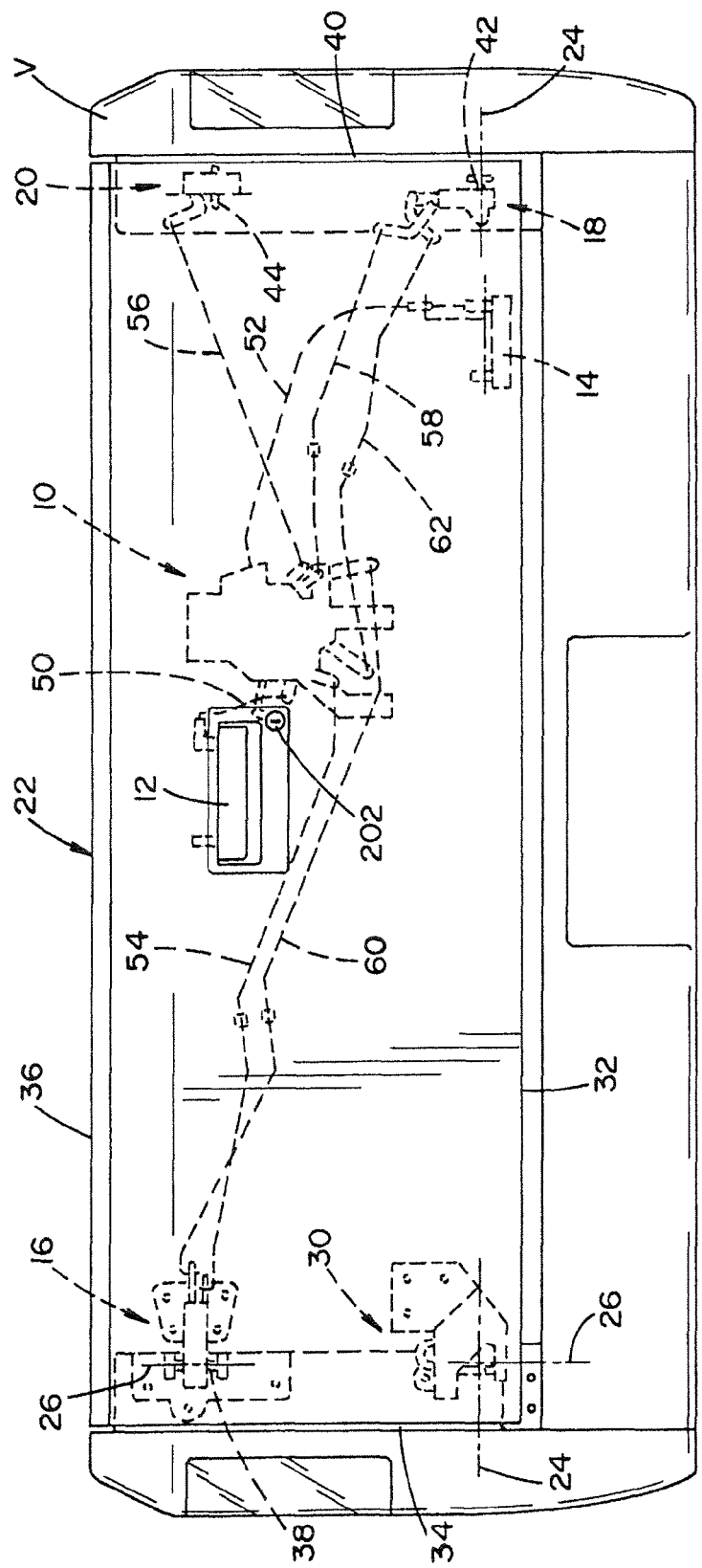
FIG. 1 is a rear elevational view of a tailgate having a tailgate synchronizer for coordinating mechanical communications between handles and locking assemblies of the tailgate.

Referring now to the drawings wherein the showings are for purposes of illustrating one or more exemplary embodiments only and not for purposes of limiting the same, FIG. 1 shows a tailgate synchronizer 10 for coordinating mechanical communications between handles 12, 14 and at least two locking assemblies (e.g., locking assemblies 16, 18 and 20) in a vehicle V closure 22, which in the illustrated embodiment is a tailgate. The illustrated tailgate 22 can be a dual-mode or dual-access tailgate that is mounted to a vehicle V for pivotal movement about a first axis 24 for movement between a closed position and a fold-open or flip-down position. As shown in the illustrated embodiment, the first axis 24 can be generally horizontal. The tailgate 22 is also alternatively able to pivot about a second axis 26 for movement between the closed position and a swing-open position. In the illustrated embodiment, the second axis 26 can be generally vertical and approximately normal or perpendicular relative to the first axis 24.

To facilitate dual-mode action of the tailgate 22, a dual-hinge assembly 30 can attach or mount to the tailgate 22 at or adjacent a first corner of the tailgate formed at the intersection of bottom edge 32 and first lateral edge 34 of the tailgate 22 (i.e., the lower left corner in FIG. 1). The dual-mode hinge assembly 30 can pivotally connect the tailgate 22, along the first and second axes 24, 26, to the vehicle V. In an exemplary embodiment, the dual-mode hinge assembly can be the same or similar to that described in commonly owned U.S. Pat. No. 6,938,941, expressly incorporated herein by reference.

The first locking assembly 16, which can also be referred to as a first hinge/lock assembly or a first latching assembly, attaches or is mounted to the tailgate 22 spaced from the hinge assembly 30 in a first direction. More specifically, the first locking assembly 16 is mounted at or adjacent a second corner of the tailgate 22 formed at the intersection of the first lateral edge 34 and a top edge 36 of the tailgate 22 (i.e., the upper left corner in FIG. 1). The first locking assembly 16 selectively latches or locks to a corresponding striker 38 to releasably lock the tailgate 22 to the vehicle V. When operating as a hinge, the first locking assembly 16 cooperates with the hinge assembly 30 to pivotally support the tailgate 22 along or about the second axis 26 and allows the tailgate 22 to move between the tailgate closed position and the swing-open position.

The second locking assembly 18 attaches or is mounted to the tailgate 22 spaced from the hinge assembly 30 in a second direction. More specifically, the second locking assembly 18, which can be referred to as a second hinge/lock assembly or a second latching assembly, is mounted at or adjacent a third corner of the tailgate formed at the intersection of the bottom edge 32 and a second lateral edge 40 of the tailgate 22 (i.e, the lower right corner in FIG. 1). The locking assembly 18 selectively latches or locks to a corresponding striker 42 to releasably lock the tailgate 22 to the vehicle V. The locking assembly 18 can cooperate with the hinge assembly 30 to pivotally support the tailgate 22 along or about the first axis 24 and allow the tailgate to move between the tailgate closed position and the fold-open or flip-down position.

The third locking assembly 20 attaches or is mounted to the tailgate 22 at or adjacent a fourth corner of the tailgate 22 formed at the intersection of the top edge 36 and a second lateral edge 40 of the tailgate 22 (i.e., the upper right corner in FIG. 1). The locking assembly 20 selectively latches to a corresponding striker 44 to releasably lock the tailgate 22 to the vehicle V. The tailgate 22 is openable toward or to the fold-open position about the axis 24 when both the locking assembly 16 is unlatched from the striker 38 and the locking assembly 20 is unlatched from the striker 44. The tailgate is openable toward or to the swing-open position along the axis 26 when both the locking assembly 18 is unlatched from the striker 42 and the locking assembly 20 is unlatched from the striker 44.

The handles 12, 14 of the tailgate 22 can include a first or upper handle 12 and second or lower handle 14. In the illustrated embodiment, the first or upper handle 12 is centrally mounted to the tailgate 22 for opening thereof in the flip-down mode, whereas the second or lower handle assembly 14 is mounted adjacent the bottom edge 32 of the tailgate 22 for opening thereof in the swing-open mode. The tailgate synchronizer 10 of the illustrated embodiment is mounted within the tailgate 22 for coordinating mechanical communications between the handles 12, 14 and the locking assemblies 16, 18, 20. In particular, the tailgate synchronizer 10 of the illustrated embodiment can coordinate mechanical communications in the tailgate 22 from the first handle 12, which unlocks the first locking assembly 16 and the third locking assembly 20, and from the second handle 14, which unlocks the second locking assembly 18 and the third locking assembly 20. In one exemplary embodiment, the synchronizer 10 can function without the use of electrical power, which enables the tailgate 22 to be operational even when electrical power is unavailable, such as might occur as the result of a dead battery in the vehicle V.

In particular, the upper handle 12 can communicate with the synchronizer 10 through a rod 50 and the lower handle 14 can communicate with the synchronizer 10 through a cable 52 (rod 50 and cable 52 shown schematically in FIG. 1). The synchronizer 10 selectively allows the upper handle 12 to unlock or unlatch the locking assemblies 16, 20 from their respective strikers 38, 44 when the upper handle 12 is pulled or actuated via rods 54, 56 (shown schematically in FIG. 1). The synchronizer 10 also allows the lower handle 14 to unlock or unlatch the locking assemblies 18, 20 from their respective strikers 42, 44 when the lower handle 14 is pulled or actuated via rods 56, 58 (shown schematically in FIG. 1).

To prevent damage to the vehicle V and/or the tailgate 22, as well as potential injury to the user of the tailgate, the tailgate 22 is prevented from operating in both of its modes (i.e., swing-open and fold-open) simultaneously. If the tailgate 22 was able to open in both modes simultaneously, tailgate 22 could potentially be connected to the vehicle V only by the hinge assembly 30, as all three locking assemblies 16, 18, 20 would be unlatched from their strikers 38, 42, 44. For this purpose, the synchronizer 10 additionally communicates with the locking assemblies 16, 18 through sensor rods 60, 62 (shown schematically in FIG. 1). Based on the communications received from the sensor rods 60, 62, the synchronizer 10 selectively enables communication between the handles 12, 14 and each of the locking assemblies 16, 18, 20.

Specifically, the locking assembly 18 is prevented from unlatching from its striker 42 whenever the locking assembly 16 is already unlatched from its striker 38. Similarly, the locking assembly 16 is prevented from unlatching from its striker 38 whenever the locking assembly 18 is already unlatched from its striker 42. Moreover, the locking assemblies 16, 18 are prevented from both unlatching from their respective strikers 38, 42 at the same time. Thus, one of the first and second locking assemblies 16 or 18 is always latched onto its striker whenever the other of the locking assemblies 16 or 18 is unlatched from its striker.

Figure 2:
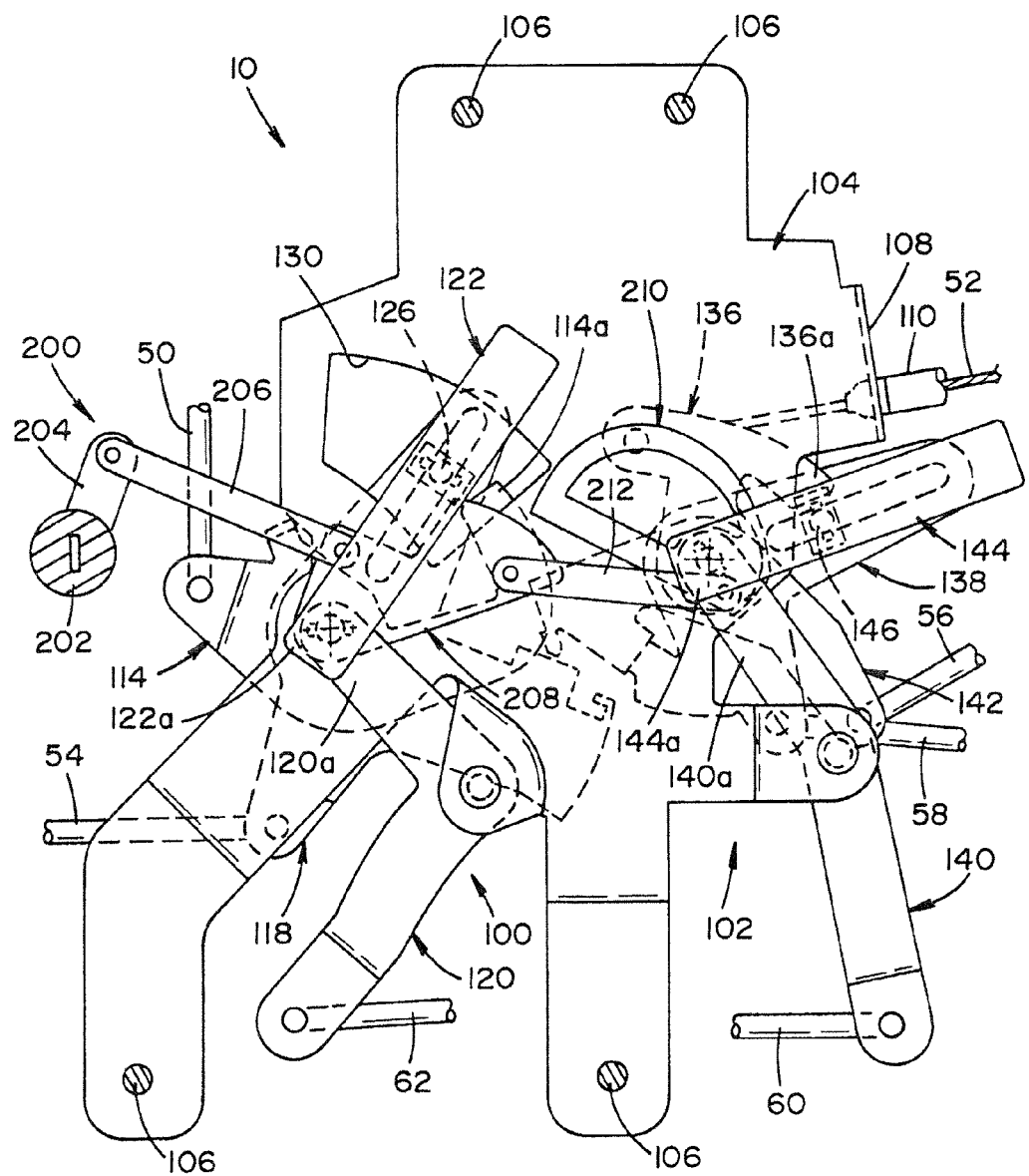
FIG. 2 is a rear elevational view of the synchronizer shown removed from the tailgate and shown with a synchronizer locking device in an unlocked state.

With reference to FIG. 2, the synchronizer 10 is shown in a resting or tailgate closed position, wherein each of the locking assemblies 16, 18, 20 are locked to their respective strikers and neither of the handles 12, 14 are pulled or actuated. The synchronizer 10 includes a plurality of levers connected to the tailgate 22 for coordinating operation between the handle assemblies 12, 14 and the locking assemblies 16, 18, 20. More particularly, the synchronizer 10 includes a first set of levers 100 connected to the actuator rod 54 of the first locking assembly 16, the sensor rod 62 of the second locking assembly 18 and the handle rod 50 of the upper handle 12. The synchronizer 10 further includes a second set of levers 102 connected to the actuator rod 56 of the third locking assembly 20, the actuator rod 58 of the second locking assembly 18, the sensor rod 60 of the first locking assembly 16 and the handle cable 52 of the lower handle 14. The sets of levers 100, 102 are rotatably connected to a mounting bracket 104, which itself can be secured to the tailgate 22 via suitable fasteners, such as rivets or bolts 106. Thus, the sets of levers 100, 102 are rotatably mounted to the tailgate 22. The bracket 104 can include a flange portion 108 having a cable support 110 mounted thereto for supporting and guiding the cable 52 into the synchronizer 10.

The first set of levers 100 includes a first or upper handle lever 114 that it is rotatable by actuation of the first handle 12. In particular, the lever 114 is pivotally connected to the upper handle rod 50 so that the lever 114 moves when the handle 12 is moved. The first set 100 additionally includes a first lock assembly actuator lever 118 that is connected to the first locking assembly 16 via the rod 54 for unlocking the first locking assembly 16 when rotated and a second locking assembly sensor lever 120 connected to the second locking assembly 18 via the sensor rod 62. The actuation lever 118 is selectively moveable by the upper handle 12 and is connected to the locking assembly 16 so that the lever 118 unlocks the first locking assembly 16 when sufficiently moved by the upper handle 12. The sensor lever 120 is rotated by the sensor rod 62 whenever the second locking assembly 18 changes states (i.e., locked and unlocked). A pin lever 122 is pivotally connected adjacent a first end 122*a* to a first leg 120*a* of the sensor lever 120 and is moved whenever the sensor lever 120 is rotated by the sensor rod 62.

Movement of the first handle 12 is translated into unlocking or unlatching of the first locking assembly 16 when movement of the first handle lever 114 is selectively transferred to the first lock assembly actuator lever 118. In the illustrated embodiment, the pin lever 122 includes a first lock assembly pin 126 for transferring rotation of the handle lever 114 to rotation of the first lock assembly actuator lever 118. The pin 126 is moveable from a first position wherein the first lock assembly pin 126 transfers movement of the first handle 12 into rotation of the first lock assembly actuator lever 118 and at least one second position wherein movement of the first handle 12 is not translated to the first lock assembly actuator lever 118. The pin 126 extends through an aperture or slot 128 (FIG. 6) defined in the actuation lever 118 for transferring movement thereto. The pin 126 also extends through an opening 130 defined in the bracket 104. In the first position, the pin 126 is position for engagement with an engaging portion 114*a* of the upper handle lever 114 such that rotation of the first handle lever 114 is translated into rotation of the first lock assembly actuator lever 118 to thereby unlock/unlatch the first locking assembly 16. When in one of the second nonrotating positions, the pin 126 does not transfer rotation of the lever 114 to rotation of the lever 118, thus the handle 12 is free to rotate but does not unlock/unlatch the first locking assembly 16.

The second set of levers 102 includes a second or lower handle lever 136 that is rotatable by actuation of the second or lower tailgate handle 14. In particular, the lower handle lever 136 is pivotally connected to the cable 52 so that the lever 136 moves when the handle 14 is moved. The second set 102 additionally includes a second lock assembly actuator lever 138, a first lock assembly sensor lever 140 and a third lock assembly actuation lever 142. The second lock assembly actuator lever 138 is connected to the second locking assembly 18 via the rod 58 to unlock the second lock assembly 18 when the lever 138 is rotated. The second locking assembly sensor lever 140 is connected to the first locking assembly 16 via the sensor rod 60. The third lock assembly actuator lever 142 is connected to the third lock assembly 20 via the rod 56 to unlock the third lock assembly 20 when the lever 142 is rotated. The actuation lever 138 is selectively movable by the lower handle 14 and is connected to the second locking assembly 18 so that the lever 138 unlocks the second locking assembly 18 when sufficiently moved by the handle 14. Rotation of the second handle lever 136 is translated into unlocking of the second locking assembly 18 when movement of the second handle 14 is selectively transferred to the second lock assembly actuator lever 138. The sensor lever 140 is rotated by the sensor rod 60 whenever the first locking assembly 16 changes states (i.e., locked and unlocked). A pin lever 144 is pivotally connected adjacent a first end 144*a* to a first leg 140*a* of the sensor lever 140 and is moved whenever the sensor lever 140 is rotated by the sensor rod 60.

Movement of the second handle 14 is translated into unlocking or unlatching of the second lock assembly 18 when movement of the second handle lever 136 is selectively transferred to the second lock assembly actuator lever 138. In the illustrated embodiment, the pin lever 144 includes a second lock assembly pin 146 for transferring rotation of the handle lever 136 to rotation of the second lock assembly actuator lever 138. The pin 146 is moveable from the first position wherein the second lock assembly pin 146 transfers movement of the second handle 14 into rotation of the second lock assembly actuator lever 138 and at least one second position wherein movement of the second handle 14 is not translated to the second lock assembly actuator lever 138. The pin 146 extends through an aperture or slot (not shown) defined in the actuator lever 138 for transferring movement thereto. In the first position, the pin 146 is in position for engagement with an engaging portion 136*a* of the lower handle lever 136 such that rotation of the handle lever 136 is translated into rotation of the second lock assembly actuator lever 138. When in each of the second nonactuating positions, the pin 146 does not transfer rotation of the lever 136, thus the handle 14 is free to rotate but does not unlock/unlatch the locking assembly 18.

The third lock assembly lever 142 is pivotally connected to the actuator rod 56. As will be described in more detail below, rotation of the first lock assembly actuator lever 118 or the second lock assembly actuator lever 138 results in rotation of the third lock assembly actuator lever 142 to unlock the third lock assembly 20. As will be appreciated by those skilled in the art, a plurality of tension springs can be provided for urging the various levers in a first or second rotatable direction, though none of the springs are illustrated herein. All such springs could have one end connected to one of the levers and a second end connected to a fixed member, which can be the bracket 104 or some other component of the tailgate 22. Those skilled in the art will appreciate that other biasing means could be used, such as various types of springs (e.g., torsion springs), the orientation of a particular lever relative to gravity, etc.

Figure 6:
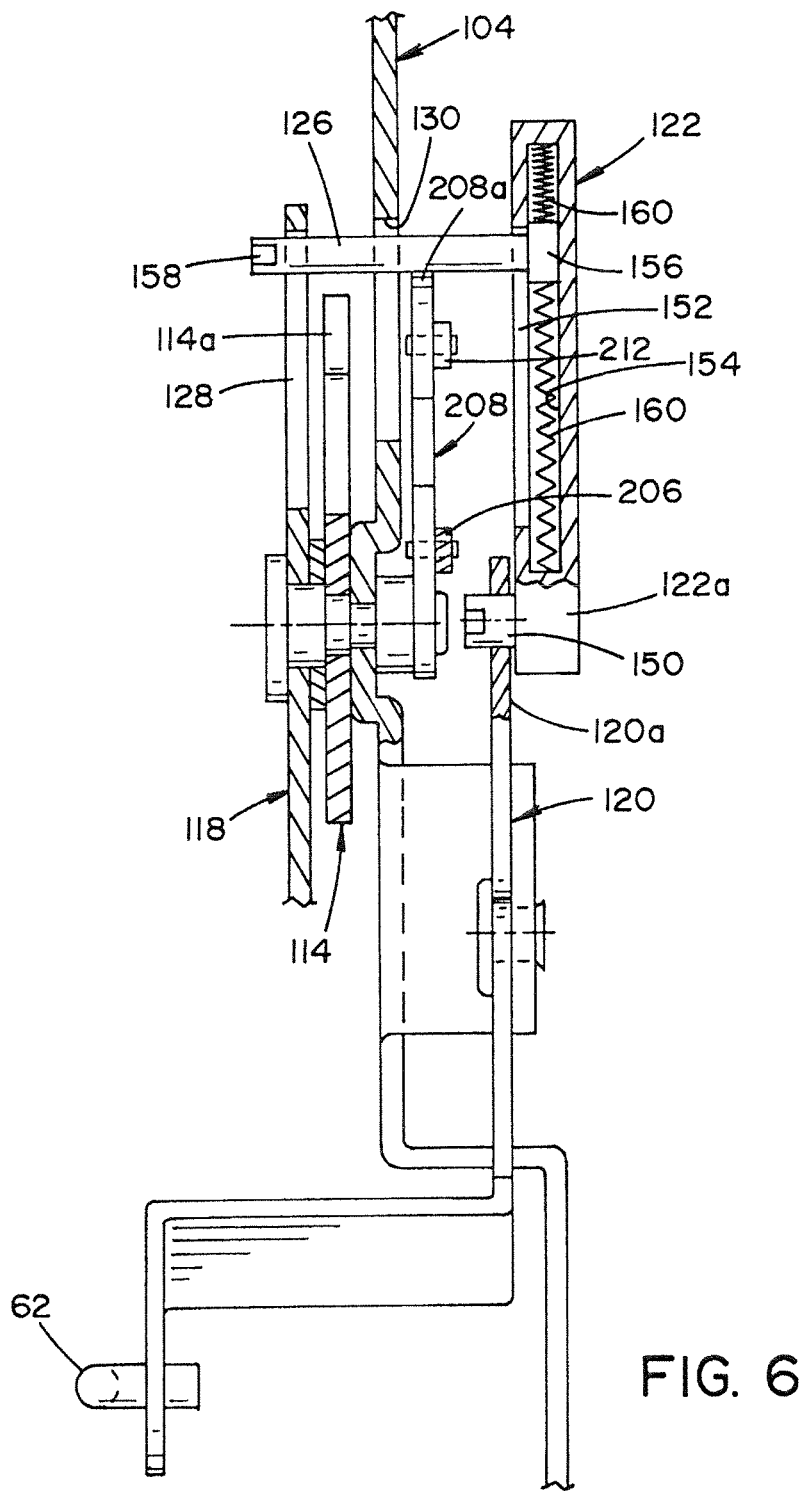
FIG. 6 is a cross-sectional view of the synchronizer taken along the line 6-6 of FIG. 3.
Figure 7:
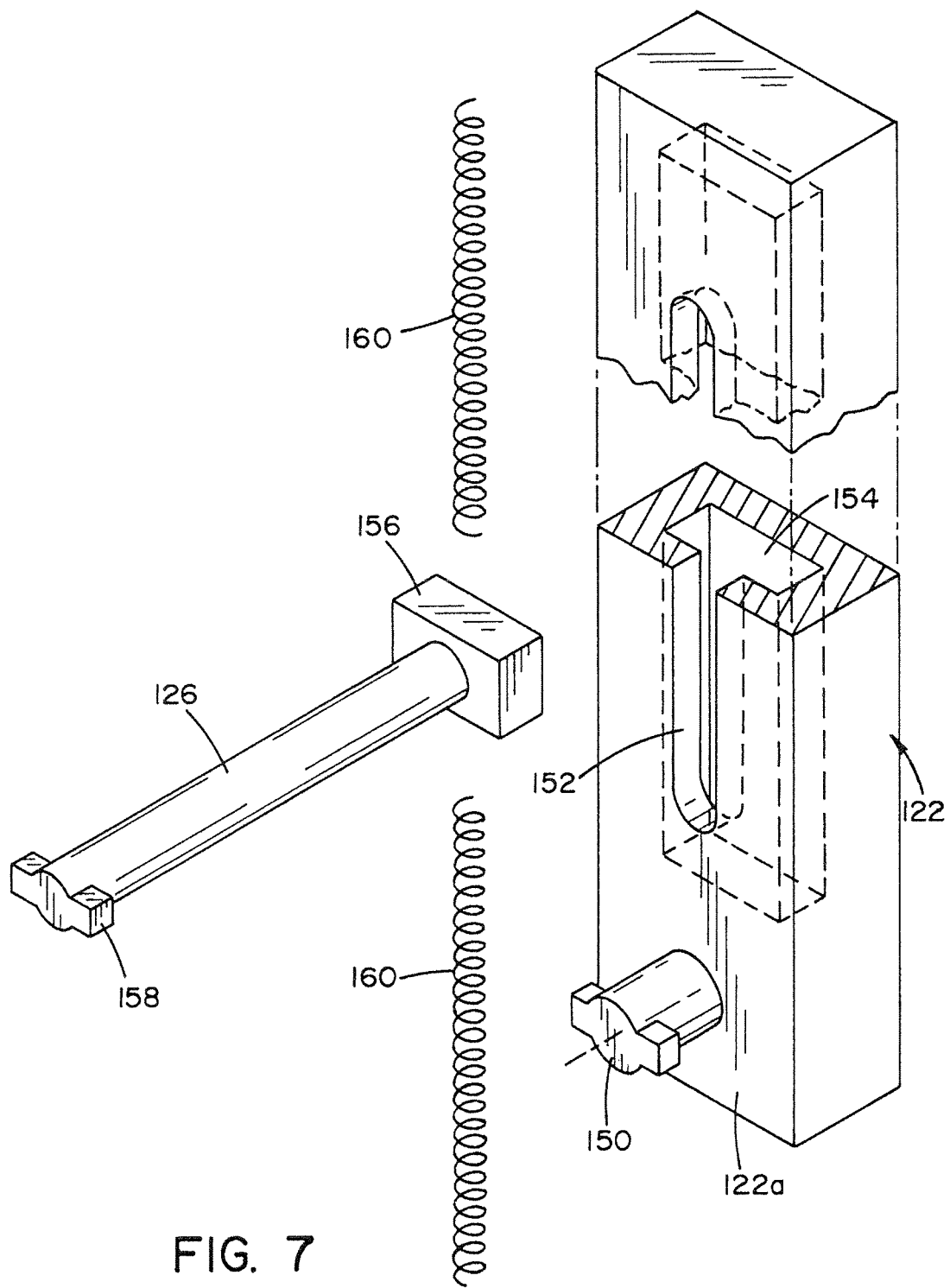
FIG. 7 is an exploded perspective view of a moveable pin assembly of the synchronizer.

With reference to FIGS. 6 and 7, the pin lever 122 and first lock assembly pin 126 will be described with more detail according to one exemplary embodiment. As shown, the lower end 122*a* of the pin lever 122 includes a raised mounting structure or pin 150 for rotatably securing the pin lever 122 to the second lock assembly sensor lever 120. The pin lever 122 is moved by the sensor lever 120 between a first position when the sensor lever 120 indicates that the locking assembly 18 is locked and a second position when the sensor lever 120 indicates that the locking assembly 18 is unlocked. The pin lever 122 includes a slotted aperture 152 through which the pin 126 is received. The pin lever 122 further includes an elongated cavity 154 in which a base 156 of the pin 126 is received for sliding movement therealong (i.e., the pin 126 is slidably disposed along a longitudinal length of the pin lever 122). Opposite the base 156, the pin 126 can include radial portions or extensions 158 which prevent axial pullout of the pin 126 from the first lock assembly actuator lever 118.

The base 156 of the pin 126 is slideably moveable along the cavity 154, which slidably moves the pin 126 along the slot 152. A biasing mechanism, such as the illustrated springs 160, can be used to urge the pin 126 toward its first position wherein the pin 126 imparts rotation from the first handle lever 114 to the first lock assembly actuator lever 118. Thus, in the first position, the pin 126 is aligned with the handle lever 114 when the pin lever 122 is in its first position for translating movement of the handle lever 114 to the lock assembly actuator lever 118. The pin 126 is slidably moveable between the first position and one or more second nonactuating positions wherein the pin 126 is offset from or misaligned with the handle lever 114 and thereby does not translate movement of the handle lever 114 to the lock assembly actuator lever 118. When the pin lever 122 is in its second position (i.e., the locking assembly 18 is locked), the pin 126 is also offset from or misaligned relative to the handle lever 114 and thus does not translate movement of the handle lever 114 to the lock assembly actuator lever 118 irrespective of a position (e.g., first position or second, non-actuating positions) of the pin 126 along the pin lever 122.

The second non-actuating positions of the pin 126 can include any position along the aperture 152 wherein the pin 126 is removed from the engaging portion 114*a* such that the engaging portion 114*a* cannot contact the pin 126. Although not illustrated in the same detail, the pin lever 144 and the second lock assembly pin 146 can be similarly constructed. Accordingly, the second lock assembly pin 146 can be urged by springs toward the first position along the pin lever 144 wherein the pin 146 imparts rotation from the second handle lever 136 to the second lock assembly actuator lever 138 and is moveable against the urging of the springs along the pin lever 144 to at least one second non-actuating position, such as any position along the lever 144 wherein the pin 146 is not engaged by the engaging portion 136*a* upon rotation of the lower handle lever 136.

As mentioned, rotation at the first handle lever 114, such as by actuation of the handle 12, is selectively imparted to the first lock assembly actuator lever 118 to mechanically connect actuation of the first handle 12 to unlocking of the first locking assembly 16. Likewise, rotation of the second handle lever 136, such as by actuation of the second handle 14, is selectively imparted to the second lock assembly actuator lever 138 to mechanically connect actuation of the second handle 136 to unlocking of the second locking assembly 18. The tailgate synchronizer 10 of the illustrated embodiment further includes a synchronizer locking device 200 for preventing imparting of rotation from the first handle lever 114 to the first lock assembly actuator lever 118 and preventing imparting of rotation of the second handle lever 136 to the second lock assembly actuator lever 138. In particular, and as will be described in more detail below, the synchronizer locking device 200 prevents impartation of rotation of the first handle lever 114 or a second handle lever 136 when the synchronizer locking device 200 is in a locked state. Accordingly, with the inclusion of the locking device 200, movement of the first handle 12 is selectively translated into a rotation of the first lock assembly actuator lever 118 based on the state of the second lock assembly actuator lever 138 and a state of the synchronizer locking device 200 (i.e., locked state or unlocked state). Likewise, movement of the second handle 14 is selectively translated into rotation of the second lock assembly actuator lever 138 based on a state of the first lock assembly actuator lever 118 and the state of the synchronizer locking device 200.

Figure 3:
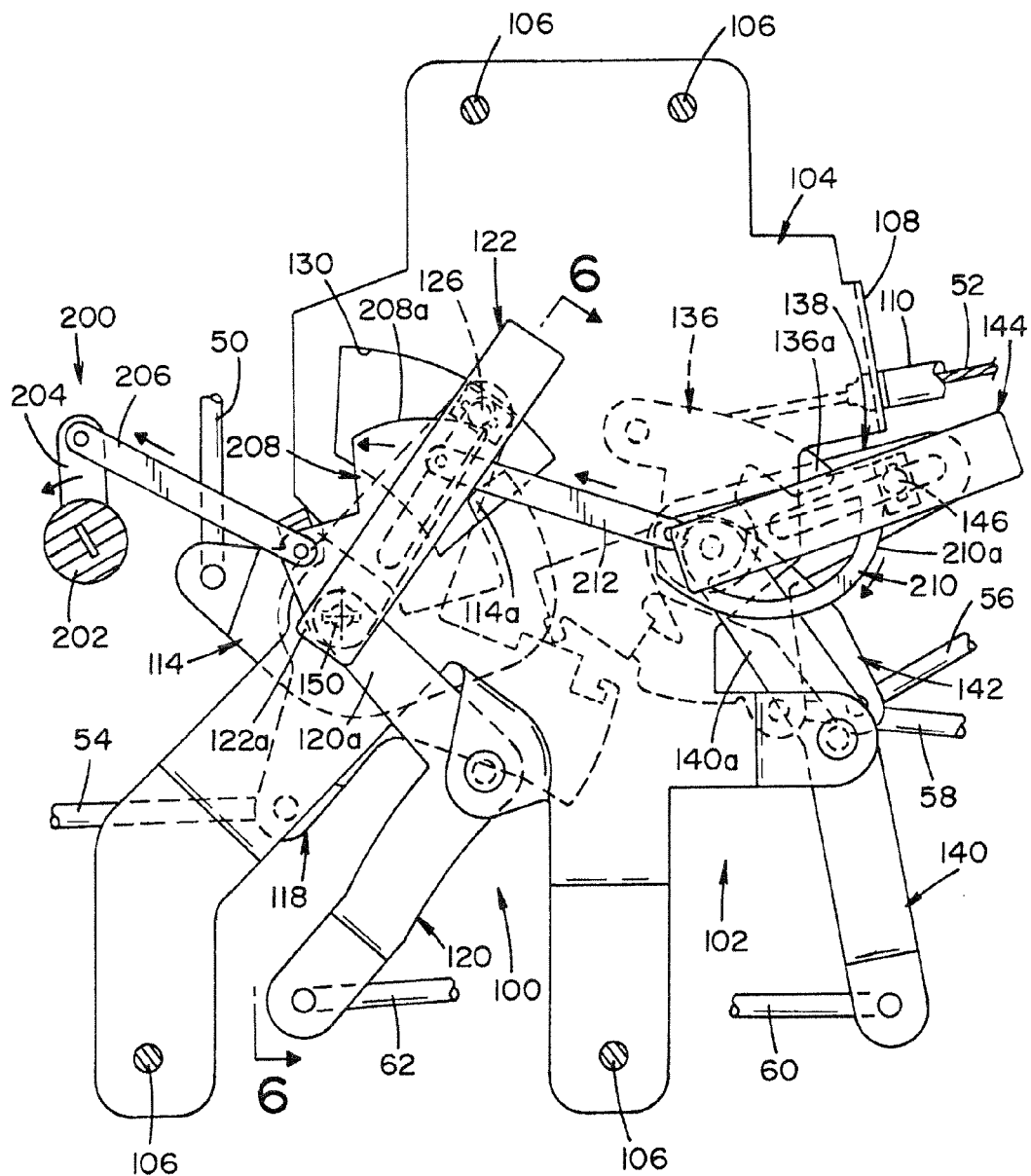
FIG. 3 is another rear elevational view of the synchronizer shown with the locking device in a locked state.
Figure 4:
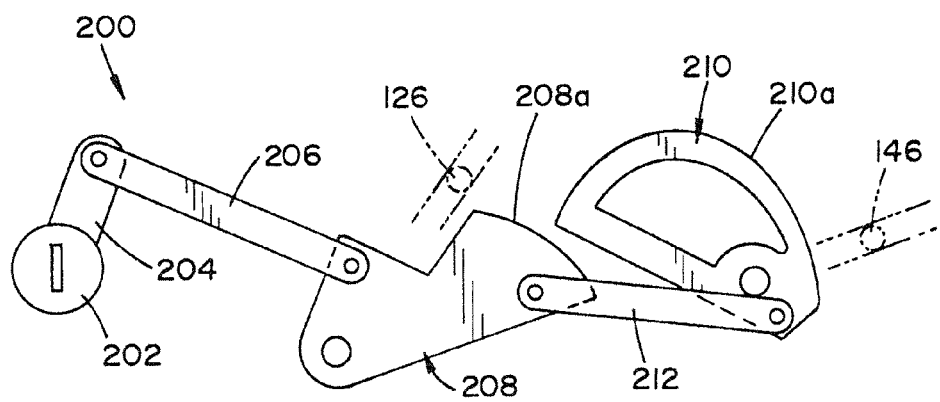
FIG. 4 is a schematic elevational view of the locking device shown removed from the synchronizer in an unlocked state.
Figure 5:
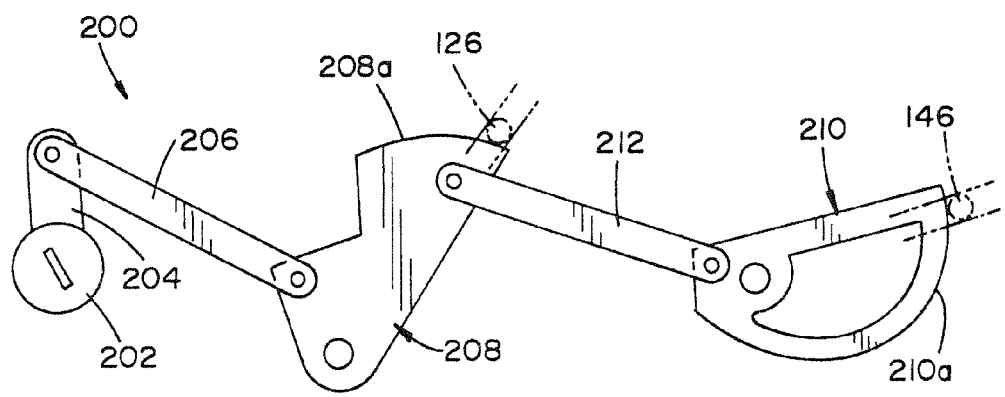
FIG. 5 is another schematic elevational view of the locking device shown removed from the synchronizer in a locked state.

With additional reference to FIGS. 4 and 5, the synchronizer locking device 200 is moveable from the first locking position or state (first locking position shown in FIGS. 2 and 4) to the second locking position or state (second locking position or state shown in FIGS. 3 and 5) for preventing the handles 12, 14 from unlatching the locking assemblies 16, 18, 20. The locking device 200 is also moveable back to the first unlocked position or state where the locking device 200 does not prevent the handles 12, 14 from unlatching the locking assemblies 16, 18, 20. As shown, the synchronizer locking device 200 can include a rotatable key cylinder 202 for moving the synchronizer locking device 200 between the locked state or position and the unlocked state or position. Through the locking device 200, the first lock assembly pin 126 is moved to one of its second nonactuating positions along the lever 122 and the second locking assembly pin 146 is moved to one of its second nonactuating positions along the lever 144 when the synchronizer locking device 200 is in the locked state. Accordingly, rotation of the lock cylinder 202 to the second locking position (the locked state or position shown in FIGS. 3 and 5) moves the first and second lock assembly pins 126, 146 to respective nonactuating second positions.

The locking device 200 further includes a mechanical linkage between the rotatable key cylinder 202 and the first and second locking assembly pins 126, 146 for moving the pins to the respective nonactuating positions when the rotatable key cylinder 202 is rotated and the locking device 200 is in the locked state or position. Accordingly, the synchronizer locking device 200 moves the first and second lock assembly pins 126, 146 to respective second non-actuating positions when in the locked state or position. In the embodiment illustrated in FIGS. 1-9, the mechanical linkage is a set of link levers and cams. As will be described in more detail below, the mechanical linkage can alternately be some other type of linkage, such as, for example, a set of cables as will be described with particular reference to FIGS. 10-12.

With continued reference to FIGS. 4 and 5, the mechanical linkage of the illustrated locking device 200 includes a lever 204 fixed to the rotatable key cylinder 202 for rotation therewith. The lever 204 has its distal end connected to another lever 206 which transfers rotational movement from the key cylinder 202 and lever 204. The synchronizer locking device 200 of this embodiment includes at least one cam, such as cams 208, 210, that urge the first and second lock assembly pins 126, 146 into respective nonactuating second positions when the rotatable key cylinder 202 is moved to the second locked position. In particular, the at least one cam includes a first cam or cam lever 208 for moving the first lock assembly actuator pin 126 toward a second non-actuating position when the rotatable lock cylinder 202 is moved to the second locked position and a second cam or cam lever 210 for moving the second lock assembly actuator pin 146 toward a second non-actuating position when the rotatable lock cylinder 202 is moved to the second locked position. The first cam 208 is connected to the rotatable lock cylinder 202 through the lever 206, which is also referred to herein as a first link, and the second cam 210 is connected to the first cam 208 through a second link or lever 212. In particular, the first cam 208 includes cam surface 208a that engages the first lock assembly pin 126 when the locking device 200 is moved to the locked position or state. The second cam 210 includes cam surface 210a for engaging and moving the second lock assembly pin 146 when the locking device 200 is moved to the locked position or state.

The tailgate synchronizer 10 coordinates and mechanically communicates with the handles 12, 14 and the lock assemblies 16, 18, 20. Based on the states or positions of the lock assemblies 16 and 18, as communicated by the sensor rods 60, 62, and further based on the state of the synchronizer locking device 200, the synchronizer 10 selectively enables or disables communication between the upper handle 12 and the locking assemblies 16, 20 and the lower handle 14 and the locking assemblies 18, 20. More particularly, if the first and second lock assemblies 16, 18 are both latched onto their respective strikers 38, 42, the sensor rods 60, 62 mechanically communicate the respective latched positions of the assemblies 16, 18 to the synchronizer 10 which then enables either of the handles 12, 14 to be operational for opening of the tailgate 22 provided the locking device 200 is in the unlocked state or position.

If the locking assembly 16 is unlatched or unlocked from the striker 38, the sensor rod 60 mechanically communicates the unlatched position of the assembly 16 to the synchronizer 10 which then disables the lower handle 14 from opening or unlatching the assemblies 18, 20. Conversely, if the locking assembly 16 is latched or locked, the sensor rod 60 mechanically communicates the latched position of the assembly 16 to the synchronizer 10 which enables the lower handle 14 to open or unlatch the assemblies 18, 20 provided the locking device 200 is in the unlocked state or position. If the locking assembly 18 is unlatched or unlocked from the striker 42, the sensor rod 62 mechanically communicates the unlatched position of the assembly 18 to the synchronizer 10 which then disables the upper handle 12 from opening or unlatching the assemblies 16, 20. Conversely, if the locking assembly 18 is latched or locked, the sensor rod 62 mechanically communicates the latched position of the assembly 18 to the synchronizer 10 which enables the upper handle assembly 12 to open or unlatch the assemblies 16, 20 providing the locking device 200 is in the unlatched or unlocked state.

The synchronizer 10 additionally prevents simultaneous operation of both handles 12, 14 to release all of the assemblies 16, 18, 20 simultaneously. When the handles 12, 14 are disabled from operating and unlatching the assemblies 16, 18, 20, whether by the position or state of the actuating levers 118, 138 or by the state or position of the locking device 200, the handles 12, 14 are still permitted freedom of movement (i.e., the first and second handles 12, 14 are always fully moveable irrespective of the state of the first locking assembly actuator lever 118 or the state of the second lock assembly actuator lever 138, and irrespective of the state of the locking device 200). That is, the first and second handles and the corresponding first and second handle levers 114, 136 are fully rotatable even when the synchronizer locking device 200 is in the locked state. Accordingly, the handles 12, 14 are always fully moveable, including when the synchronizer locking device 200 is in the locked state.

Figure 8:
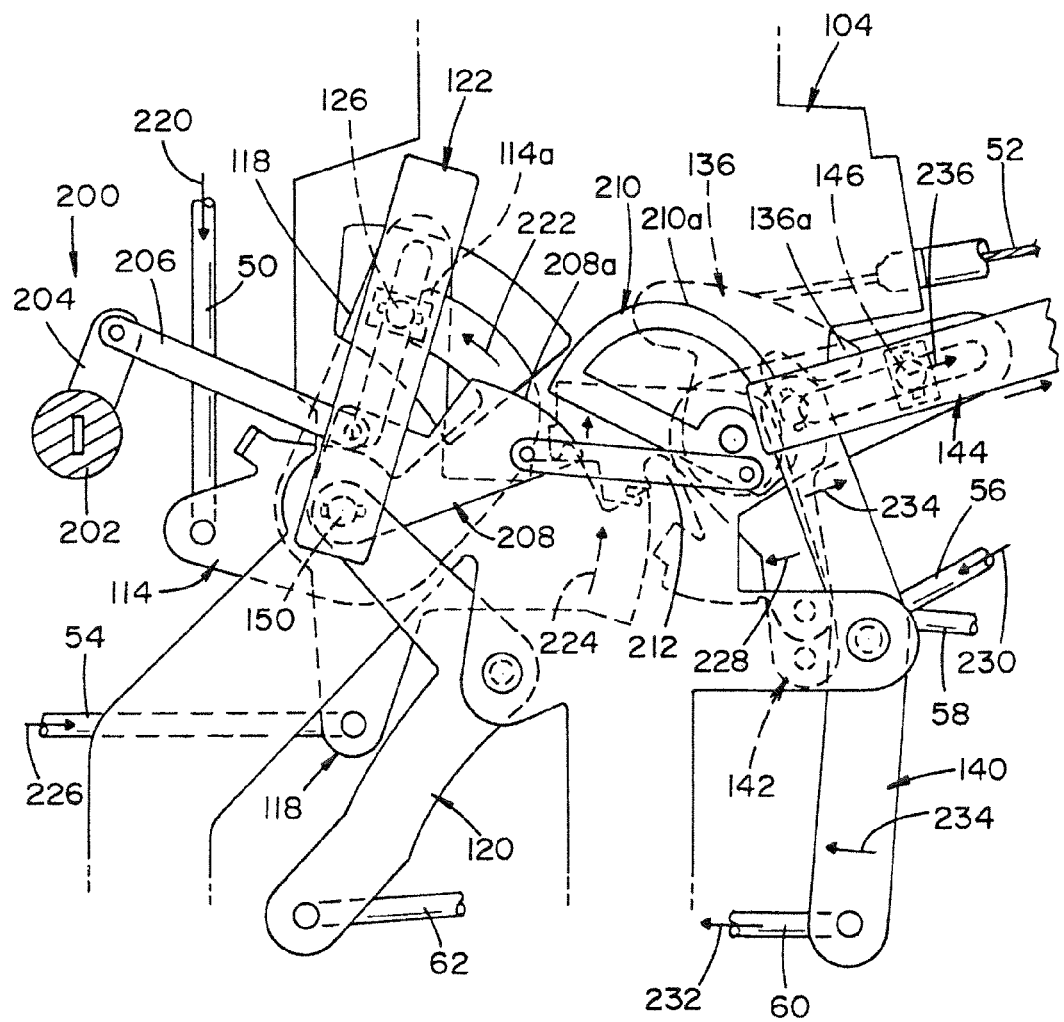
FIG. 8 is a schematic rear elevational view of the synchronizer shown with the locking device in the unlocked state and an upper handle being pulled.

In operation, with specific additional reference to FIG. 8, the stroke of the upper handle 12 when pulled is communicated to the synchronizer 10 through the rod 50. In particular, pulling of the upper handle 12 causes the rod 50 to move toward the synchronizer 10, in the direction of arrow 220, thereby rotating the upper handle lever 114 in the first rotatable direction as indicated by arrow 222. If the locking assembly 18 is in the locked or latched position when the handle 12 is pulled and the locking device 200 is in the unlocked state or position (as shown in FIG. 8), the synchronizer 10 connects the stroke of the rod 50 to the rods 54 and 56 which unlocks the assemblies 16, 20 and enables the tailgate 22 to be opened toward the flip-down position. More particularly, rotation of the lever 114 in direction of arrow 222 causes the engaging portion 114a to engage and forcibly move the pin 126, which is in the first position. Movement of the pin 126 by the engaging portion 114a causes rotation of the first lock assembly actuator lever 118 in the first rotatable direction, represented by arrow 224, which pulls the rod 54.

Rotation of the lever 118 in the direction of arrow 224 pulls the rod 54 toward the synchronizer 10 in the direction of arrow 226 which unlatches or unlocks the first lock assembly 16. Rotation of the lever 118 in the direction of arrow 224 also causes rotation of the lever 142 in the second rotatable direction represented by arrow 228. Rotation of the lever 142 in the direction of arrow 228 pulls the rod 56 toward the synchronizer 10 in the direction of arrow 230 which unlatches or unlocks the locking assembly 20.

When the first locking assembly 16 is unlocked, the sensor rod 60 moves to its retracted position represented by arrow 232 when the first locking assembly 16 is in an unlocked condition. Pulling of the rod 60 causes the sensor lever 140 to rotate in the second rotatable direction, represented by arrows 234, which causes the pin lever 144 with the pin 146 to move in the direction of arrow 236 toward another second non-actuating position. The pin 146 is still held in its normal position along the lever 144 but the entire lever 144 is moved. This results in the pin 146 moving away from the engaging portion 136a of the lower handle lever 136 which disengages or disables use of the lower handle 14 for purposes of unlocking the assemblies 18, 20.

Figure 9:
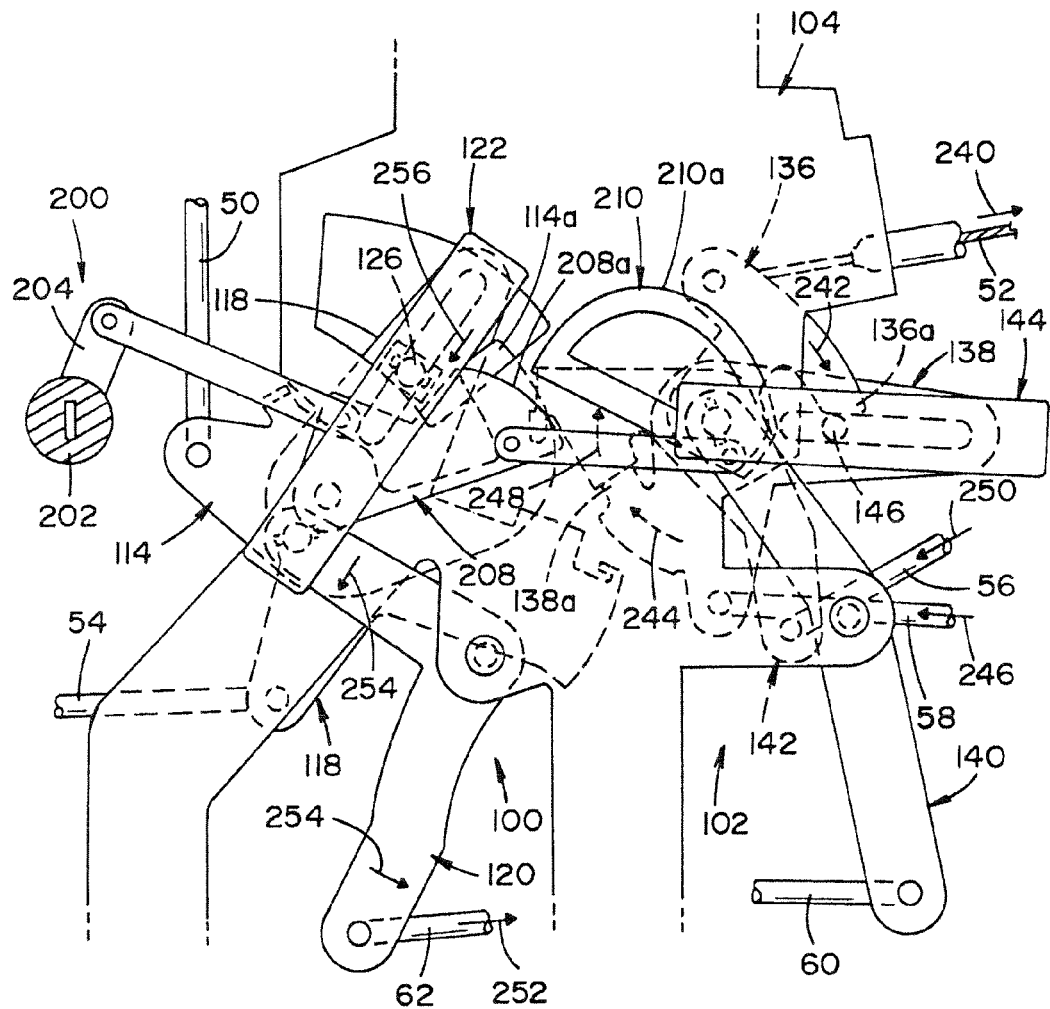
FIG. 9 is a schematic rear elevational view of the synchronizer shown with the locking device in the unlocked state and the lower handle being pulled.

With reference to FIG. 9, when the lower handle 14 is pulled, its stroke is communicated to the synchronizer 10 through the cable 52. More particularly, pulling of the lower handle 14 causes the cable 52 to move away from the synchronizer 10, in the direction of arrow 240, thereby rotating the lower handle lever 136 in the second rotatable direction as indicated by arrow 242. If the second locking assembly 16 is in the locked or latched position when the handle 12 is pulled, and the locking device 200 is in the unlocked position or state, the synchronizer 10 connects the stroke of the cable 56 to the rods 56, 58 which unlocks the assemblies 18, 20 and enables the tailgate 22 to be opened toward the swing-open position. More particularly, rotation of the lever 136 in the direction of arrow 242 causes the engaging portion 136a to engage and forcibly move the pin 146, which is in its first position. Movement of the pin 146 by the engaging portion 136a causes rotation of the second lock assembly actuator lever 138 in the second rotatable direction, represented by arrow 244.

Rotation of the lever 138 in the direction of arrow 244 pulls the rod 58 toward the synchronizer 10 in the direction of arrow 246 which unlatches or unlocks the second locking assembly 18. Rotation of the lever 138 in the direction of arrow 244 also causes an engaging portion 138a of the lever 138 to rotate the third locking assembly actuator lever 142 in the second rotatable direction represented by the arrow 248 which pulls the rod 56 in the direction of arrow 250 to unlock or unlatch the third locking assembly 20.

When the second locking assembly 18 is unlocked, the sensor rod 62 moves to its retracted position, represented by arrow 252, due to action of the second locking assembly 18. Pulling of the rod 62 causes the sensor lever 120 to rotate in the first rotatable direction, represented by arrows 254, which causes the pin lever 122 with a pin 126 to move in the direction of arrow 256 toward another second nonactuating position. This results in the pin 126 moving away from the engaging portion 114a of the upper handle lever 114 which disengages or disables use of the upper handle 12 for purposes of unlocking the locking assembly 16, 20. By this arrangement, the first lock assembly pin 126 is in one of the second nonactuating positions when the second lock assembly actuator lever 138 is in a rotated position (i.e., to unlock/unlatch the second locking assembly 18, which rotates the sensor lever 140) and the second lock assembly pin 146 is in one of the second nonactuating positions when the first lock assembly actuator lever 118 is in a rotated position (i.e., to unlock/unlatch the first locking assembly 16, which rotates the sensor lever 120).

The synchronizer 10 is also configured to prevent both handles 12, 14 from simultaneously unlocking the first and second locking assemblies 16, 18. Generally, one of the handles 12, 14 will have its stroke communicated to the synchronizer 10 prior to the other of the handles 12, 14, even when both handles are attempted to be pulled simultaneously. As long as one of the handles 12, 14 has its stroke communicated to the synchronizer 10 prior to the other of the handles 12, 14, the handle having its stroke communicated last will be disengaged or disabled and unable to unlock the assemblies to which it is otherwise operable to unlock. Should both handles 12, 14 have their strokes communicated to the synchronizer 10 simultaneously, an engagement between the first set of levers 100 and the second set of levers 102 prevents operation of either of the handles 12, 14 and does not permit either of the handles from unlocking any of the assemblies 16, 18, 20.

Figure 10:
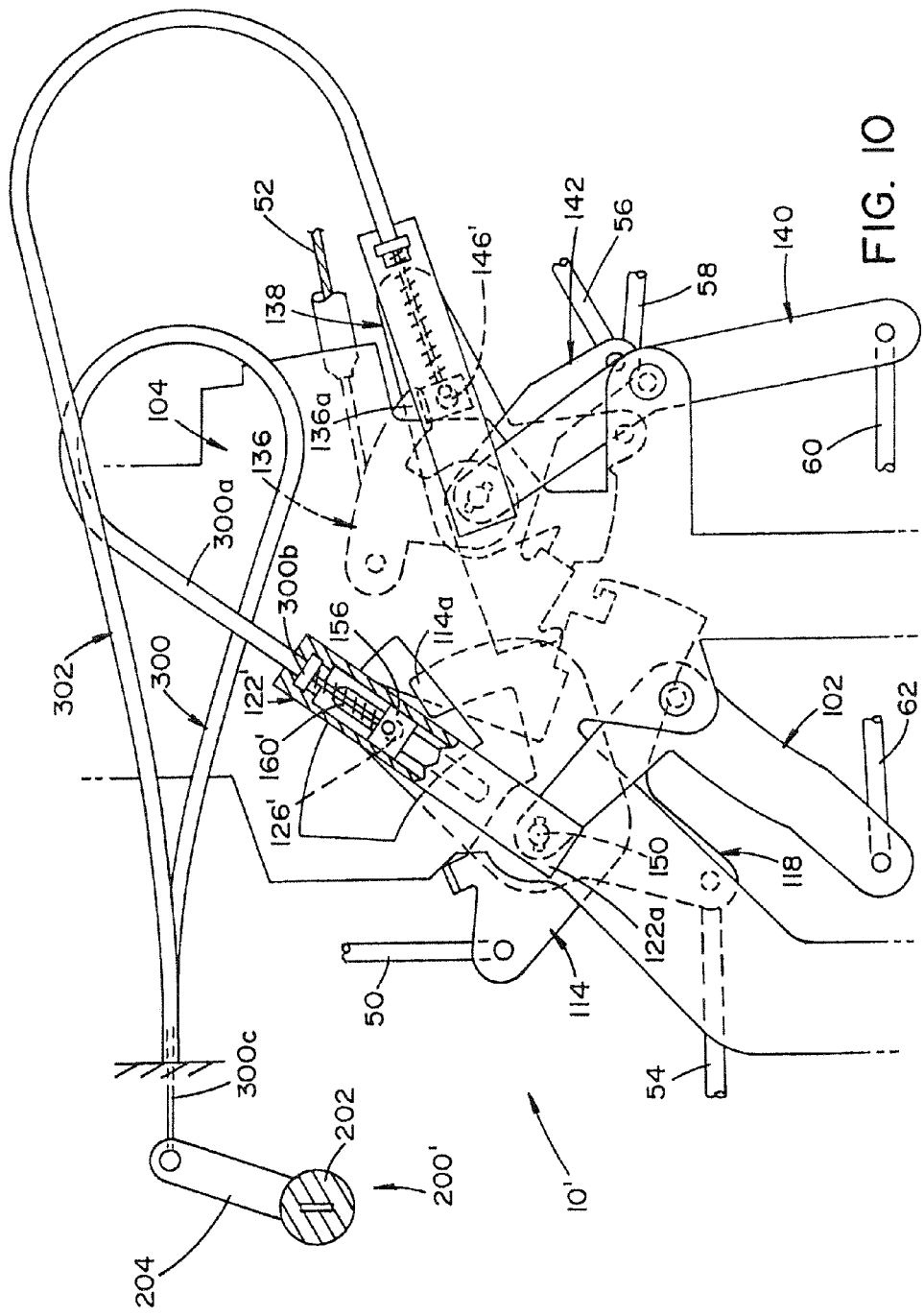
FIG. 10 is a schematic rear elevational view of a synchronizer according to an alternate exemplary embodiment shown with a locking mechanism in an unlocked state.
Figure 11:
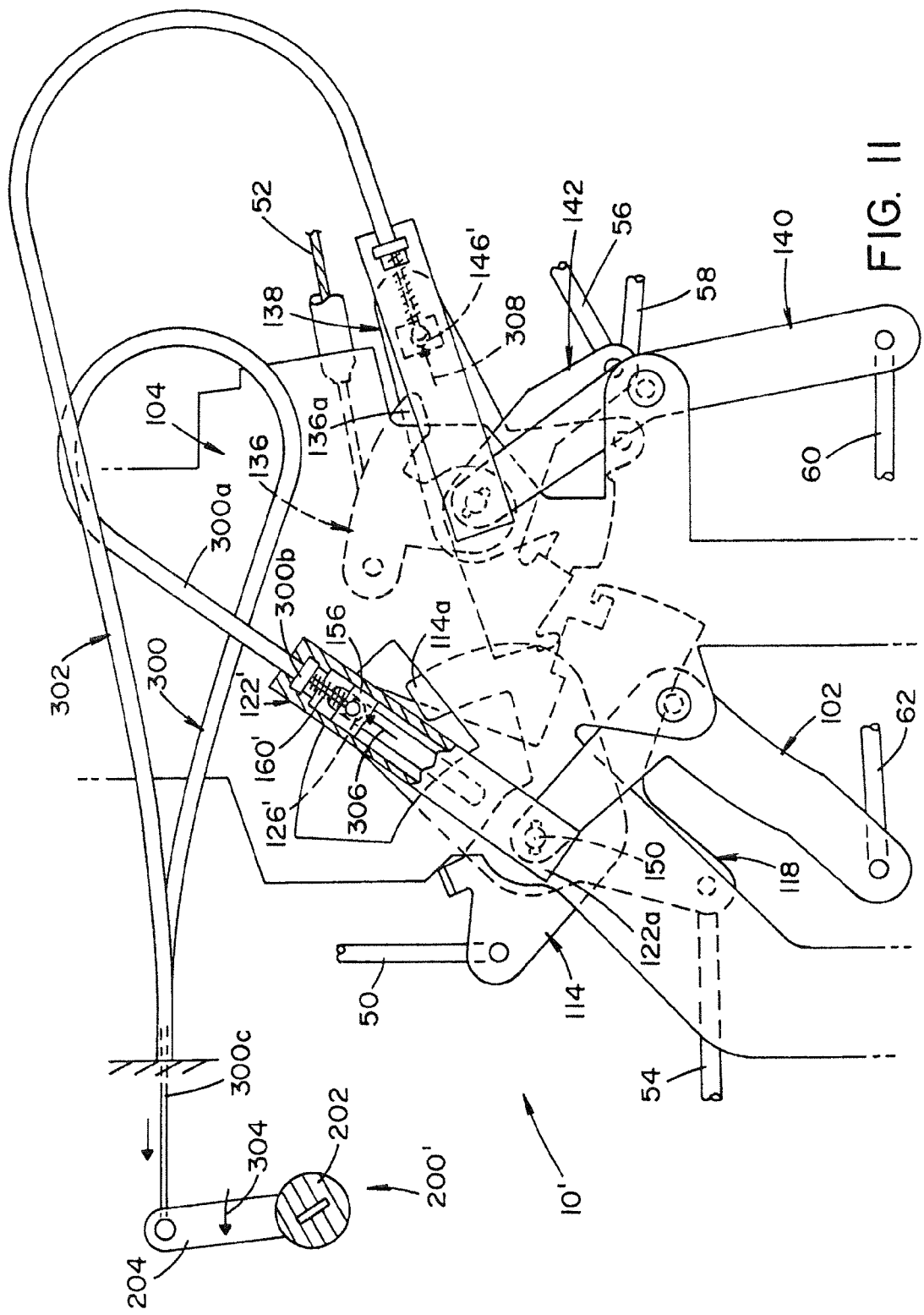
FIG. 11 is another schematic rear elevational view of the synchronizer of FIG. 10 shown with the locking device in a locked state.
Figure 12:
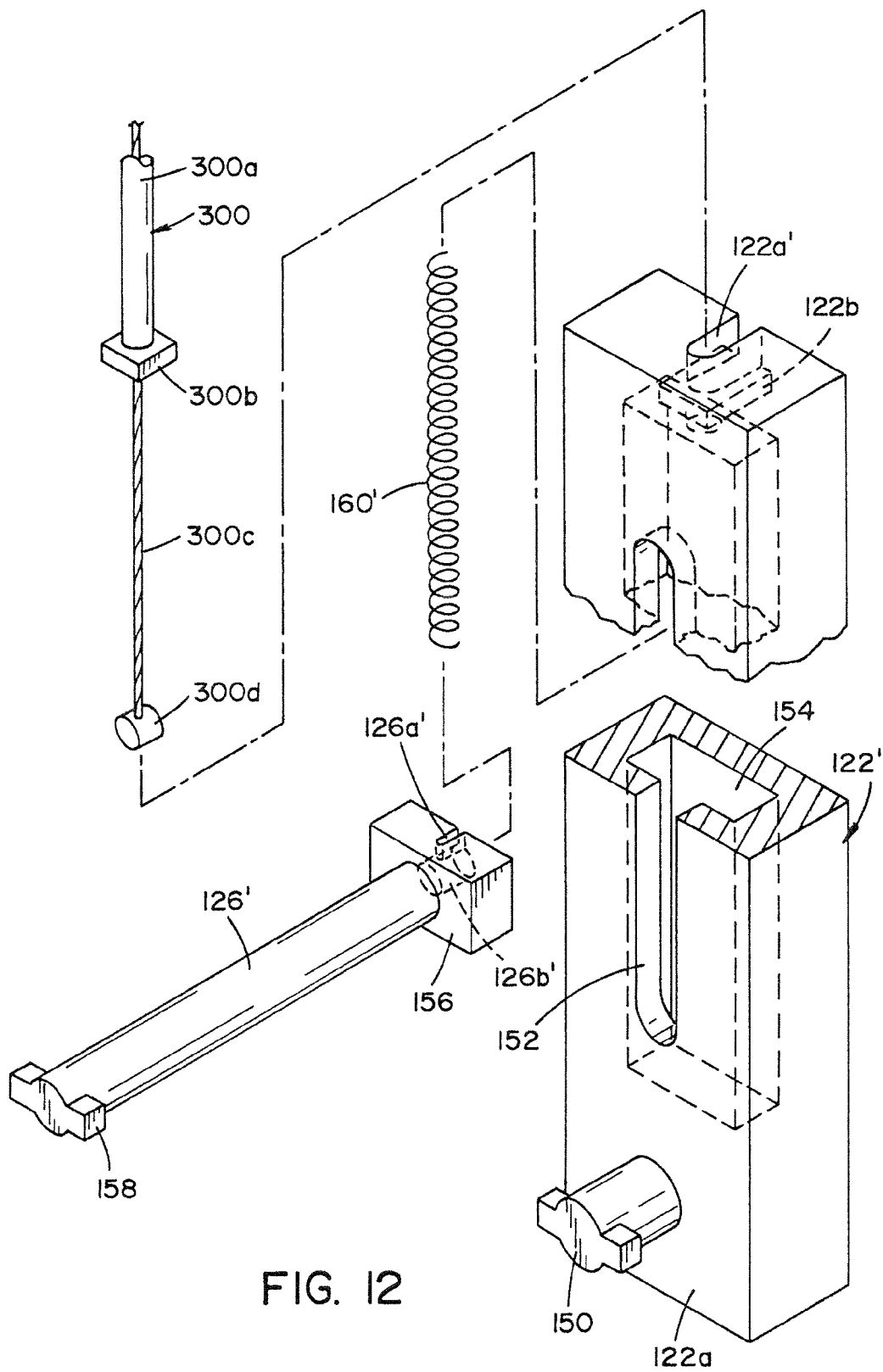
FIG. 12 is an exploded perspective view of a moveable pin assembly for the synchronizer of FIG. 10.

With reference to FIGS. 10-12, a tailgate synchronizer 10' is illustrated for coordinating mechanical communications in a tailgate, such as tailgate 22, between handles and locking assemblies thereof. The synchronizer 10' can be the same as the synchronizer 10, except as indicated herein and accordingly like reference numbers are used to reference like components. The synchronizer 10' includes a locking device 200' that is moveable between an unlocked state and a locked state, wherein handles, such as handles 12, 14, are prevented from unlatching the locking assemblies 16, 18, 20. In particular, movement of the handles 12, 14 is prevented from translating into rotation of the lock assemblies 16, 18, 20 when the synchronizer locking device 200' is in the locked state. Like the locking device 200, the locking device 200' includes a rotatable key cylinder 202 for moving the synchronizer locking device 200' between a locked position and an unlocked position (or a locked state and an unlocked state). The synchronizer locking device 200' also includes a mechanical linkage between the rotatable key cylinder 202 and locking pins 126', 146' of the synchronizer 10' for moving the pins 126', 146' to non-actuating positions when the rotatable key cylinder 202 is rotated to a locked position.

Instead of the link levers and cams, the mechanical linkage of the locking device 200' is a set of cables. More particularly, lock lever 204 is coupled to the rotatable lock cylinder 202 for co-rotation therewith. Coupled to a distal end of the link 204 are first and second locking assembly cables 300, 302. Accordingly, by this arrangement, the first locking assembly cable 300 has a first end connected to the rotatable lock cylinder 202 via the link 204 and a second end connected to the first lock assembly pin 126' for moving the pin 126' to a non-actuating position. Likewise, the second locking assembly cable 302 has a first end connected to the rotatable lock cylinder 202 via the link 204 and a second end connected to the second lock assembly pin 146' for moving the second lock assembly pin 146' to a non-actuating position. In operation, when the rotatable lock cylinder 202 is moved to the locked position as indicated by the arrow 304 in FIG. 11, the cables 300, 302 pull the pins 126', 146' to respective non-actuating position as indicated by arrows 306, 308. In these non-actuating positions, movement of the upper handle lever 114 or the lower handle lever 136 fails to engage the respective pins 126', 146' and no unlatching or unlocking or the locking assemblies 16, 18, 20 can occur.

With particular reference to FIG. 12, one exemplary embodiment of a modified pin lever 122' is illustrated for accommodating the cable locking device 200'. In most respects, the pin lever 122' can be the same as the pin lever 122 illustrated in detail in FIG. 7. However, only a single spring 160' is required to maintain the pin 126' in its first position and pin 146' in its first position. The lever 122' and the pin 126' are, as shown, slightly modified to accommodate mounting and moving of the cable and pin arrangement. Though not shown, the same or similar lever could be used in association with the pin 146'. In particular, in the illustrated embodiment, the cable 300 has a sheath 300a passing through a slot 122a' defined in the lever 122' and a terminal mounting portion 300b received in a corresponding aperture 122b' of the lever 122' for fixing the sheath 300a relative to the lever 122'. A movable wire 300c of the cable 300 passes through a slot 126a' and a terminal mounting end 300d of the wire 300c is received in a corresponding aperture 126b' of the pin 126'. Accordingly, when the wire 300c is pulled by the locking cylinder 202 and link 204, the pin 126' is pulled along the slot 152 against the urging of the spring 160' to move the pin 126' to a nonactuating position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tailgate synchronizer for coordinating mechanical communications in a tailgate from a first handle for unlocking a first lock assembly of the tailgate and from a second handle for unlocking a second lock assembly of the tailgate, comprising:

a first lock assembly actuator lever connected to the first lock assembly to unlock the first lock assembly when rotated;

a second lock assembly actuator lever connected to the second lock assembly to unlock the second lock assembly when rotated; and a synchronizer locking device having a locked state and an unlocked state, the synchronizer locking device including a rotatable lock cylinder movable between a first unlocked position wherein the synchronizer locking device is in the unlocked state and a second locked position wherein the synchronizer locking device is in the locked state;

wherein movement of the first handle selectively translates into rotation of said first lock assembly actuator lever based on a state of said second lock assembly actuator lever and a state of the synchronizer locking device, the state of the synchronizer locking device being one of said locked state and said unlocked state; and wherein movement of the second handle selectively translates into rotation of said second lock assembly actuator lever based on a state of said first lock assembly actuator lever and said state of said synchronizer locking device.

2. The tailgate synchronizer of claim 1 wherein said first and second handles are always fully movable irrespective of said state of said first lock assembly actuator lever or said state of said second lock assembly actuator lever.

3. The tailgate synchronizer of claim 2 wherein said first and second handles are always fully movable irrespective of said state of said synchronizer locking device.

4. The tailgate synchronizer of claim 1 further including:
a first handle lever rotatable by actuation of said first handle, rotation of said first handle lever being translated into unlocking of said first lock assembly when said movement of said first handle is selectively transferred to said first lock assembly actuator lever; and
a second handle lever rotatable by actuation of said second tailgate handle, rotation of said second handle lever being translated into unlocking of said second lock assembly when said movement of said second handle is selectively transferred to said second lock assembly actuator lever.

5. The tailgate synchronizer of claim 4 further including:
a first pin lever which includes a first lock assembly pin movable from a first position wherein said first lock assembly pin transfers said movement of said first handle into said rotation of said first lock assembly actuator lever and at least one second position wherein movement of said first handle is not translated to said first lock assembly actuator lever; and
a second in lever which includes a second lock assembly pin movable from a first position wherein said second lock assembly pin transfers said movement of said second handle into said rotation of said second lock assembly actuator lever and at least one second position wherein movement of said second handle is not translated to said second lock assembly actuator lever,
wherein said first lock assembly pin is in the at least one second position when said synchronizer locking device is in said locked state, and said second lock assembly pin is in the at least one second position when said synchronizer locking device is in said locked state.

6. The tailgate synchronizer of claim 5 wherein rotation of said lock cylinder to said second locked position moves said first and second lock assembly pins to their respective at least one second positions.

7. The tailgate synchronizer of claim 6 wherein said synchronizer locking device includes at least one cam that urges said first and second lock assembly pins into their respective at least one second positions when said rotatable lock cylinder is moved to said second locked position.

8. The tailgate synchronizer of claim 7 wherein said at least one cam includes a first cam for moving said first lock assembly actuator pin toward said at least one second position when said rotatable lock cylinder is moved to said second locked position and a second cam for moving said second lock assembly actuator pin toward said at least one second position when said rotatable lock cylinder is moved to said second locked position, said first cam connected to said rotatable lock cylinder through a first link and said second cam connected to said first cam through a second link.

9. The tailgate synchronizer of claim 6 wherein said synchronizer locking device includes:
a first locking assembly cable having a first end connected to said rotatable lock cylinder and a second end connected to said first lock assembly pin for moving said first lock assembly pin to said at least one second position; and
a second locking assembly cable having a first end connected to said rotatable lock cylinder and a second end connected to said second lock assembly pin for moving said second lock assembly pin to said at least one second position.

10. The tailgate synchronizer of claim 1 wherein said movement of said first handle is not translated into rotation of said first lock assembly actuator lever when said state of said synchronizer locking device is in said locked state and movement of said second handle is not translated into rotation of said second lock assembly actuator lever when said state of said synchronizer locking device is in said locked state.

11. The tailgate synchronizer of claim 1 further including a third lock assembly actuator lever connected to an associated third lock assembly to unlock the associated third lock assembly when rotated, rotation of said first lock assembly actuator lever or said second lock assembly actuator lever rotating said third lock assembly actuator lever to unlock the associated third lock assembly.

12. A tailgate synchronizer comprising:
a first lock assembly actuator lever unlocking an associated first lock assembly when rotated;
a second lock assembly actuator lever unlocking an associated second lock assembly when rotated;
a first handle lever rotated by actuation of an associated first handle, rotation of said first handle lever selectively imparted to said first lock assembly actuator lever to mechanically connect actuation of the associated first handle to unlocking of the associated first lock assembly;
a second handle lever rotated by actuation of an associated second handle, rotation of said second handle lever selectively imparted to said second lock assembly actuator lever to mechanically connect actuation of the associated second handle to unlocking of the associated second lock assembly;
a first lock assembly pin having a first position wherein said first lock assembly pin imparts said rotation from said first handle lever to said first lock assembly actuator lever and a second nonactuating position;
a second lock assembly pin having a first position wherein said second lock assembly pin imparts said rotation from said second handle lever to said second lock assembly actuator lever and a second nonactuating position;
a synchronizer locking device for selectively preventing imparting of rotation of said first handle lever to said first lock assembly actuator lever and imparting of rotation of said second handle lever to said second lock assembly actuator lever, wherein said synchronizer locking device has an unlocked state and a locked state, said synchronizer locking device moving said first and second lock assembly pins to respective second nonactuating positions when in said locked state, and wherein said synchronizer locking device includes:
a rotatable key cylinder for placing said synchronizer locking device in said locked state and said unlocked state; and
a mechanical linkage between said rotatable key cylinder and said first and second locking assembly pins for moving said pins to their respective said second nonactuating positions when said rotatable key cylinder is rotated and said synchronizer locking device is in said locked state.

13. The tailgate synchronizer of claim 12 wherein said synchronizer locking device prevents impartation of said rotation of said first handle lever or said second handle lever when said synchronizer locking device is in the locked state.

14. The tailgate synchronizer of claim 13 wherein said first and second handle levers are fully rotatable when said synchronizer locking device is in said locked state.

15. The tailgate synchronizer of claim 12 wherein said mechanical linkage is one of a set of link levers and cams or a set of cables.

16. A tailgate synchronizer comprising:
   a first lock assembly actuator lever unlocking an associated first lock assembly when rotated;
   a second lock assembly actuator lever unlocking an associated second lock assembly when rotated;
   a first handle lever rotated by actuation of an associated first handle, rotation of said first handle lever selectively imparted to said first lock assembly actuator lever to mechanically connect actuation of the associated first handle to unlocking of the associated first lock assembly;
   a second handle lever rotated by actuation of an associated second handle, rotation of said second handle lever selectively imparted to said second lock assembly actuator lever to mechanically connect actuation of the associated second handle to unlocking of the associated second lock assembly;
   a synchronizer locking device for selectively preventing imparting of rotation of said first handle lever to said first lock assembly actuator lever and imparting of rotation of said second handle lever to said second lock assembly actuator lever;
   a first pin lever having one end rotatably secured to a second sensor lever, said first pin lever moved by said second sensor lever between a first position when said second sensor lever indicates that the second lock assembly is locked and a second position when said second sensor lever indicates that the second lock assembly is unlocked;
   a second pin lever having one end rotatably secured to a first sensor lever, said second pin lever moved by the first sensor lever between a first position when said first sensor lever indicates that the first lock assembly is locked and a second position when said first sensor lever indicates that the first lock assembly is unlocked;
   a first pin slidably disposed along a longitudinal length of said first pin lever, said first pin slidably moveable between a first position wherein said first pin is aligned with the first handle lever for translating movement of the first handle lever to a first lock assembly actuator lever when said first pin lever is in said first position and a second non-actuating position wherein said first pin is offset from said first handle lever and thereby does not translate movement of said first handle lever to said first lock assembly actuator lever; and
   a second in slidably disposed along a longitudinal length of said second in lever, said second pin slidably movable between a first position wherein said second pin is aligned with the second handle lever for translating movement of the second handle lever to a second lock assembly actuator lever when said second pin lever is in said first position and a second non-actuating position wherein said second in is offset from said second handle lever and thereby does not translate movement of said second handle lever to said second lock assembly actuator lever.

17. The tailgate synchronizer of claim 16 wherein said first pin is movable between said first position and said second position based on the position of a lock cylinder of the synchronizer locking device; and
   said second pin is movable between said first position and said second position based on the position of the lock cylinder of the synchronizer locking device.

\* \* \* \* \*

UNITED STATES PATENT AND TRADEMARK OFFICE
CERTIFICATE OF CORRECTION

PATENT NO. : 8,720,956 B2  
APPLICATION NO. : 12/638079  
DATED : May 13, 2014  
INVENTOR(S) : Murray Page 1 of 1

It is certified that error appears in the above-identified patent and that said Letters Patent is hereby corrected as shown below:

In the Claims:

Col. 13, line 37, Claim 5, the word "in" should be replaced with --pin--.

Col. 16, line 21, Claim 16, the word "in" should be replaced with --pin--.

Col. 16, line 22, Claim 16, the word "in" should be replaced with --pin--.

Col. 16, line 28, Claim 16, the word "in" should be replaced with --pin--.

Signed and Sealed this  
Fifth Day of August, 2014

Michelle K. Lee  
*Deputy Director of the United States Patent and Trademark Office*